US011611514B2

(12) United States Patent
Yanev et al.

(10) Patent No.: US 11,611,514 B2
(45) Date of Patent: Mar. 21, 2023

(54) FLOW QUEUEING METHOD AND SYSTEM (71) Applicant: Rakuten Mobile, Inc., Tokyo (JP)

(72) Inventors: Mihail Yanev, Tokyo (JP); Paul Harvey, Tokyo (JP); Pierre Imai, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/368,835

(22) Filed: Jul. 7, 2021

(65) Prior Publication Data
US 2022/0014474 A1 Jan. 13, 2022

Related U.S. Application Data (60) Provisional application No. 63/049,560, filed on Jul. 8, 2020.

(51) Int. Cl.
H04L 47/32 (2022.01)
H04L 47/30 (2022.01)
H04L 12/54 (2022.01)
H04L 47/74 (2022.01)
H04L 12/70 (2013.01)

(52) U.S. Cl.
CPC .......... *H04L 47/32* (2013.01); *H04L 12/5601* (2013.01); *H04L 47/30* (2013.01); *H04L 47/746* (2013.01); H04L 2012/5681 (2013.01)

(58) Field of Classification Search
CPC ..... H04L 47/32; H04L 12/5601; H04L 47/30; H04L 47/746; H04L 2012/5681
See application file for complete search history.

(56) References Cited

U.S. PATENT DOCUMENTS

2016/0241484 A1* 8/2016 De Schepper ........ H04L 47/196

* cited by examiner

Primary Examiner — Kibrom T Hailu
(74) Attorney, Agent, or Firm — Hauptman Ham, LLP (57) ABSTRACT A method includes receiving a packet. The method further includes determining whether the packet is part of a responsive connection. The method further includes determining whether a responsive buffer is full in response to a determination that the packet is part of the responsive connection. The method further includes applying a responsive probability to the packet in response to a determination that the responsive buffer is full. The method further includes determining whether to drop the packet based on the responsive probability. The method further includes accepting the packet for processing in response to a determination that the responsive buffer is not full or in response to a determination not to drop the packet.

20 Claims, 3 Drawing Sheets

FLOW QUEUEING METHOD AND SYSTEM

PRIORITY CLAIM AND CROSS-REFERENCE

This application claims priority to Provisional Application No. 63/049,560, filed Jul. 8, 2020, which is hereby incorporated by reference in its entirety.

BACKGROUND

Intermediate devices, such as routers, are between endpoints in a communication network and transport information to enable communication between users and between a user and a server. These devices include buffers, also called queues, in a memory to store packets of data waiting to be processed. As the amount of data communicated through a network increases, the speed of receiving of packets of data exceeds the processing ability of the device. Once the number of packets within the buffer or queue reaches a threshold value, newly incoming packets have a probability of being dropped in order to maintain flow within the network.

Dropped packets reduce the amount of information communicated by the network and lead to user frustration in some instances. In some approaches, packets are randomly assigned a drop probability upon receipt of the packet if the buffer exceeds the threshold value. In some approaches, a packet is immediately dropped if the space within the buffer or queue is full. In some approaches, packets are dropped based on an amount of delay associated with the packet.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Management of flow of data through a network helps to maintain communication between users and between a user and a server. The decision to accept or drop a received packet will determine whether the communication proceeds, is delayed or prevented all together. Some approaches, such as droptail first in first out (droptailFIFO), are reactive approaches that drop packets only after a queue is full. Some approaches, such as random early detection (RED), proportional integrated enhanced (PIE), or controlled delay (CoDel), apply a drop probability to an incoming packet regardless of the type of connection used to convey the packet or the type of information in the packet.

In contrast, a flow queueing method that accounts for whether a connection is responsive will help with proactively controlling transmission of packets within a network. Further, a flow queueing method that prioritizes establishing of connections will help to ensure that connections are established between a sender and a receiver so that the sender is informed that a requested connection is possible. Combining the prioritization of responsive connections and packets including set up information for establishing connections will help to improve overall performance of a network and prompt senders to utilize responsive connections within the network.

Some approaches are limited to the use of certain communication protocols, such as transmission control protocol (TCP). By limiting the queueing process to a single protocol, these approaches are not adaptable to later developed protocols as networks grow and evolve new technologies. In contrast, a flow queueing method that is agnostic with respect to the communication protocol has an enhanced usability as networks grow and evolve.

In this application, a responsive connection is a connection where the sender alters the speed of outputting packets in response to stateful network information, e.g., packet loss. One example of such behavior is TCP's congestion control. In some embodiments, the packets are lost because the packets are dropped, for example, by an intermediate device, such as a router. In this application, an unresponsive connection is a connection where the sender maintains a speed of outputting packets regardless of whether the sender receives information that the packets are being lost. A sender that is incapable of receiving information related to whether packets are being lost would be part of an unresponsive connection because the sender is incapable of adjusting the output rate in response to receiving information related to packet loss.

Figure 1:
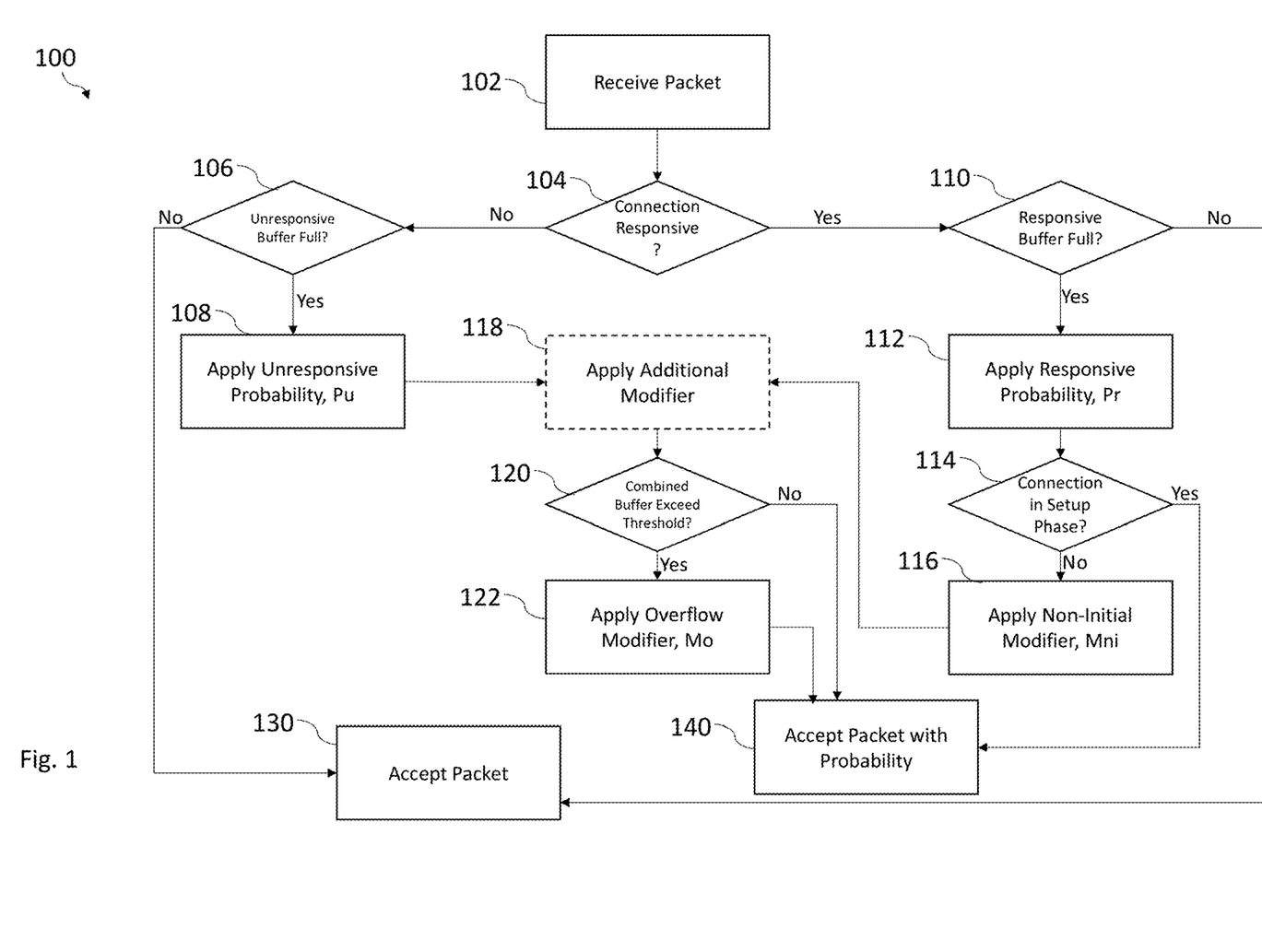
FIG. 1 is a flowchart of a method of flow queueing in accordance with some embodiments.

FIG. 1 is a flowchart of a method 100 of flow queueing in accordance with some embodiments. Method 100 is agnostic with respect to communication protocol. That is, method 100 is usable with any communication protocol. Method 100 prioritizes communication with responsive connections in order to entice senders to be responsive and help to avoid overwhelming the network. This type of proactive flow control maximizes the usefulness of the network for all users. Method 100 also prioritizes establishing new connections. This prioritization helps to ensure that senders know that a connection is available, which increases the usability of the network and improves user satisfaction with the network.

In operation 102, a packet is received. In some embodiments, the packet is received using TCP. In some embodiments, the packet is received using a different communication protocol. In some embodiments, the packet is received directly from the sender, for example, from a user terminal. In some embodiments, the packet is received from an intermediate device between the device implementing the method 100 and the sender. In some embodiments, the packet includes information for establishing a connection with the network.

In operation 104, a determination is made whether the connection is a responsive connection. The connection is determined to be responsive if the sender reduces a speed of outputting packets in response to receiving information that packets are being lost along the connection. The loss of packets along the connection indicates that packets are being dropped, which indicates that the network is approaching a maximum capacity of the network.

In some embodiments, the determination is made based on identification information in the packet. In some embodiments, the determination is made based on a frequency of received packets from a same sender. In some embodiments, the determination is made based on a previously established connection with the sender. In some embodiments, the determination is made based on comparing the sender with a stored list of sender that utilize a responsive connection.

In response to a determination that the connection is not a responsive connection, i.e., "No," the method 100 proceeds to operation 106. In response to a determination that the connection is a responsive connection, i.e., "Yes," the method 100 proceeds to operation 110.

In operation 106, a determination is made regarding whether the unresponsive buffer is full. The determination is made by comparing a number of packets within the unresponsive buffer with a maximum capacity of the unresponsive buffer. The unresponsive buffer is a buffer for holding packets from unresponsive connections awaiting processing. The unresponsive buffer accounts for less than half of the entire memory for storing packets awaiting processing. A size of the memory for storing packets varies depending on hardware in the network. The size of the memory is pre-determined based on the expected usage of the network. The unresponsive buffer accounts for less than half of the memory because the method 100 prioritizes responsive connections, so a larger portion of the memory is allotted to responsive connections. In addition, maintaining overflow capacity within the overall memory beyond the combined resources of the unresponsive buffer and the responsive buffer permits receipt of new packets and continued implementation of the method 100. In some embodiments, the unresponsive buffer accounts for about 25% to about 35% of an entire memory for storing packets awaiting processing. In some embodiments, the unresponsive buffer accounts for about 30% of the entire memory for storing packets awaiting processing. As a size of the unresponsive buffer increases, overflow capacity or size of the responsive buffer is decreased; and more packets from unresponsive connections will be accepted. As the size of the unresponsive buffer decreases, overflow capacity or size of the responsive buffer increases; and fewer packets from unresponsive connections will be accepted.

In response to a determination that the unresponsive buffer is not full, i.e., "No," the method 100 proceeds to operation 130 and the packet is accepted. In response to a determination that the unresponsive network is full, i.e., "Yes," the method 100 proceeds to operation 108.

In operation 108, an unresponsive probability Pu is assigned to the packet. The unresponsive probability Pu is the probability that the packet will be dropped prior to processing. In some embodiments, the unresponsive probability Pu ranges from about 3% to about 15%. In some embodiments, the unresponsive probability Pu is about 6%. The unresponsive probability Pu was determined based on empirical analysis of networks. As the unresponsive probability Pu increases, then a risk of the packet being dropped increases which slows communication from the sender and reduces customer satisfaction. An increased unresponsive probability Pu also more highly prioritizes responsive connections. As the unresponsive probability Pu decreases, then a risk of overwhelming the network increases because the odds that the packet will be accepted for processing increases. A reduced unresponsive probability Pu reduces prioritization of responsive connections.

In operation 110, a determination is made regarding whether the responsive buffer is full. The determination is made by comparing a number of packets within the responsive buffer with a maximum capacity of the responsive buffer. The responsive buffer is a buffer for holding packets from responsive connections awaiting processing. The responsive buffer is larger than the unresponsive buffer in order to prioritize responsive connections. As noted above, the size of the memory for storing packets varies depending on hardware in the network and is pre-determined based on the expected usage of the network. A size of the responsive buffer is determined in combination with a size of the unresponsive buffer in order to maintain overflow capacity within the overall memory beyond the combined resources of the unresponsive buffer and the responsive buffer permits receipt of new packets and continued implementation of the method 100. In some embodiments, the responsive buffer accounts for about 40% to about 60% of an entire memory for storing packets awaiting processing. In some embodiments, the responsive buffer accounts for about 50% of the entire memory for storing packets awaiting processing. As a size of the responsive buffer increases, overflow capacity or size of the unresponsive buffer is decreased; and more packets from responsive connections will be accepted. As the size of the responsive buffer decreases, overflow capacity or size of the unresponsive buffer increases; and fewer packets from responsive connections will be accepted.

In response to a determination that the responsive buffer is not full, i.e., "No," the method 100 proceeds to operation 130 and the packet is accepted. In response to a determination that the responsive network is full, i.e., "Yes," the method 100 proceeds to operation 112.

In operation 112, a responsive probability Pr is assigned to the packet. The responsive probability Pr is the probability that the packet will be dropped prior to processing. The responsive probability Pr is less than the unresponsive probability Pu. In some embodiments, the unresponsive probability Pu is about two-time to about three-times greater than the responsive probability Pr. In some embodiments, the responsive probability Pr ranges from about 1% to about 5%. In some embodiments, the responsive probability Pr is about 2%. The responsive probability Pr was determined based on empirical analysis of networks. As the responsive probability Pr increases, then a risk of the packet being dropped increases which slows communication from the sender and reduces customer satisfaction. An increased responsive probability Pr also decreases prioritization of responsive connections. As the responsive probability Pr decreases, then a risk of overwhelming the network increases because the odds that the packet will be accepted for processing increases. A reduced responsive probability Pr increases prioritization of responsive connections.

By prioritizing responsive connections, method 100 is able to incentivize senders to use responsive connections, the policy allows for different behavior as compared to unresponsive connections. This incentive helps to proactively control the flow of data on the network and reduce the risk of the network being overwhelmed. This incentive also helps the network controller to establish preferential relationships with senders in order to offer preferential treatment on the network and increase customer satisfaction with the network. In some embodiments, the policy is adjusted based on the design of the network. For example, in some embodiments, if re-transmission of packets is unnecessary, the policy is adjusted to incentivize non-responsive connections.

In operation 114, a determination is made regarding whether the connection is in a setup phase. Determining whether the connection is in a setup phase helps to prioritize establishing of new connections. By establishing a new connection, then the sender will receive information that the connection is established so that the sender does not attempt to establish connections using other networks or other communication nodes. This helps to preserve battery life when the sender is a mobile device, such as a smart phone, which in turn increases customer satisfaction. Establishment of new connections also increases the usability of the network and profitability of the network owner.

In some embodiments, the determination is made based on a number of packets received as part of the responsive connection. In some embodiments, the packet is considered as part of a setup phase in response to the packet being one of a first five packets received in the connection. In some embodiments, the packet is determined to be part of the setup phase based on information contained within the packet.

In response to a determination that the packet is part of the setup phase, i.e., "Yes," the method 100 proceeds to operation 140 and the packet is accepted based on the responsive probability Pr. In response to a determination that the packet is not part of the setup phase, i.e., "No," the method 100 proceeds to operation 116.

In operation 116, a non-initial modifier Mni is applied to the responsive probability Pr. The non-initial modifier Mni increases the probability that the packet will be dropped when the packet is not part of the setup phase. This helps to prioritize the establishment of new connections within the network. In some embodiments, the non-initial modifier Mni is applied by adding an additional percentage to the responsive probability. In some embodiments, the additional percentage ranges from about 0.5% to about 2%. In some embodiments, the non-initial modifier Mni is applied by multiplying the responsive probability Pr by an additional factor. In some embodiments, the additional factor ranges from about 1.25 to about 2.0. As a magnitude of the non-initial modifier Mni increases, prioritization of establishment of new connections increases while prioritization of established responsive connections is decreased with respect to unresponsive connections. As a magnitude of the non-initial modifier Mni decreases, prioritization of establishment of new connections decreases while prioritization of established responsive connections is increased with respect to unresponsive connections.

The method 100 includes operations 114 and 116 for responsive connections in order to prioritize establishing new connections for responsive connections at the expense of established responsive connections. In some embodiments, the method 100 also includes similar operations for unresponsive connections in order to prioritize establishing new connections for unresponsive connections at the expense of established unresponsive connections.

In operation 118, additional modifiers are applied to the unresponsive probability Pu or the responsive probability Pr (modified by the non-initial modifier Mni). The operation 118 modifies the probability of the packet being accepted based on metrics other than whether the packet is part of a setup phase. The operation 118 is an optional operation. In some embodiments, operation 118 is omitted. Omitting operation 118 reduces an amount of processing used to determine whether to accept a packet. Including operation 118 permits further prioritization of packets based on metrics specified by a network controller or human operator.

In some embodiments, the additional modifier is applied by adding an additional percentage to the corresponding probability (unresponsive probability Pu or modified responsive probability Pr). In some embodiments, the additional modifier is applied by multiplying the corresponding probability by an additional factor. The additional percentage or additional factor are determined based on the metric used to apply the additional modifier and the importance of that metric to the network controller. As a magnitude of the additional modifier increases, prioritization of establishment of new connections increases and prioritization responsive connections is increased with respect to unresponsive connections. As a magnitude of the additional modifier decreases, prioritization of establishment of new connections decreases and prioritization of responsive connections is decreased with respect to unresponsive connections.

In some embodiments, the operation 118 applies an additional modifier based on delay created by accepting the packet. In some embodiments, if a delay created by accepting the packet exceeds a threshold value, then the additional modifier is applied. In some embodiments, as an amount of delay for accepting the packet increases, a magnitude of the additional modifier increases.

In some embodiments, the operation 118 applies an additional modifier based on a bursty nature of the connection. A bursty nature of the connection refers to whether the connection is silent for periods of time followed by a large volume of information in a short time period. In some embodiments, if the connection is deemed to be bursty based on a pre-defined threshold, then the additional modifier is applied. In some embodiments, as the bursty nature of the connection increases, a magnitude of the additional modifier increases.

In some embodiments, the operation 118 applies an additional modifier based on a size of the packet. In some embodiments, if the size of the packet exceeds a threshold value, then the additional modifier is applied. In some embodiments, as the size of the packet increases, a magnitude of the additional modifier increases.

In some embodiments, the operation 118 applies an additional modifier based on loss experienced by the sender. If a sender has experienced frequent packet loss, the connection of that sender will be slower. In order to maintain customer satisfaction, the additional modifier reduces the probability of the packet being dropped if the sender has experienced frequent packet loss. In some embodiments, the determination of frequent packet loss is based on a comparison between a threshold value and the number of packets dropped by the method 100 within a predetermined time period. In some embodiments, the threshold value is the same for both unresponsive connections and responsive connections. In some embodiments, threshold value for responsive connections is less than the threshold value for unresponsive connections in order to prioritize responsive connections. In some embodiments, if the frequency of packet loss exceeds the threshold value, then the additional modifier is applied to reduce the probability of dropping the packet. In some embodiments, as the frequency for dropping packets from the connection increases, a magnitude of the additional modifier increases further reducing the probability of dropping the packet.

In some embodiments, the method 100 includes an additional modifier for a single metric, e.g., delay. In some embodiments, the method 100 applies a plurality of modifiers corresponding to different metrics, e.g., size and frequency of loss by the sender. As a number of modifiers applied increases, processing load for determining whether to accept the packet increases while selectivity of accepting packets also increases. As a number of modifiers applied decreases, processing load for determining whether to accept the packet decreases while selectivity of accepting packets also decreases.

In operation 120, a determination is made regarding whether a combined buffer exceeds a threshold Tc. The combined buffer is a combination of the unresponsive buffer and the responsive buffer. In some embodiments, the threshold Tc is a sum of the percentages of the memory allotted to each of the unresponsive buffer and the responsive buffer. In some embodiments, the threshold Tc is less than or equal to the sum of the percentages of the memory allotted to each of the unresponsive buffer and the responsive buffer. In some embodiments, the threshold Tc is greater than the sum of the percentages of the memory allotted to each of the unresponsive buffer and the responsive buffer. Setting the threshold Tc to be less than the sum helps to further prioritize responsive connections because the threshold is reached sooner meaning that an overflow modifier Mo is applied to more packets. In some embodiments, the threshold Tc ranges from about 75% to about 85% of the entire memory for storing packets awaiting processing. In some embodiments, the threshold Tc is about 80% of the entire memory for storing packets awaiting processing. As the threshold Tc increases, a risk of the network being overwhelmed increases. As the threshold Tc decreases, prioritization of responsive connections over unresponsive connections decreases.

In response to a determination that combined buffer exceeds the threshold Tc, i.e., "Yes," the method 100 proceeds to operation 112. In response to a determination that the combined buffer is equal to or less than the threshold Tc, i.e., "No," the method 100 proceeds to operation 140 and the packet is accepted based on the corresponding probability (including any modifications from operation 116 or operation 118).

In operation 122, an overflow modifier Mo is applied to the corresponding probability, which includes any modifiers. For example, in some embodiments, the responsive probability is modified by both the non-initial modifier Mni and the overflow modifier Mo. The overflow modifier Mo increases the probability that the packet will be dropped when the combined buffer exceeds the threshold Tc. This helps to reduce the risk of the network being overwhelmed and the combined buffer becoming completely full. In some embodiments, the overflow modifier Mo is applied by adding an additional percentage to the responsive probability. In some embodiments, the additional percentage ranges from about 0.5% to about 2%. In some embodiments, the overflow modifier Mo is applied by multiplying the corresponding probability by an additional factor. In some embodiments, the additional factor ranges from about 1.25 to about 2.0. As a magnitude of the overflow modifier Mo increases, the risk of the network being overwhelmed decreases, prioritization of establishment of new connections increases and prioritization of established responsive connections is increased with respect to unresponsive connections. As a magnitude of the overflow modifier Mo decreases, the risk of the network being overwhelmed increases, prioritization of establishment of new connections decreases and prioritization of established responsive connections is decreased with respect to unresponsive connections.

The method 100 includes a single overflow modifier Mo regardless of whether the connection is responsive or unresponsive. In some embodiments, the overflow modifier for an unresponsive connection is greater than an overflow modifier for a responsive connection.

In operation 130, the packet is accepted for processing. The packet is accepted when the corresponding buffer, the unresponsive buffer or the responsive buffer, is not full. Accepting the packet means that the packet will be processed and transmitted to a next intermediate device in the system, e.g., a delay emulator, or to the receiver. In some embodiments, an acknowledgement is sent to the sender in response to acceptance of the packet.

In operation 140, the packet is accepted with probability. The probability of the packet being dropped is determined based on the unresponsive probability Pu or the responsive probability Pr adjusted based on any modifiers, e.g., from operation 116, operation 118 or operation 122. A random function is performed to determine whether to drop the packet. For example, if the probability of dropping the packet is 10% and the random function is set to generate a random number from 1 to 100, then the packet is dropped if the number is any of 1 to 10; otherwise the packet is accepted. The above is merely an example to help explain the use of a random function to determine whether to drop a packet. One of ordinary skill in the art would understand that other random functions and comparisons with the probability of dropping the packet are within the scope of this disclosure. Accepting the packet means that the packet will be processed and transmitted to a next intermediate device in the system, e.g., another router, or to the receiver. Dropping the packet means that the packet will be removed from the device executing method 100 and not further processed. In some embodiments, the sender will assume the packet was not accepted in response to failure to receive an acknowledgement.

In some embodiments, the method 100 includes at least one additional operation. For example, in some embodiments, the method 100 includes determining whether an unresponsive connection is in a setup phase to prioritize establishment of new connections for unresponsive connections. In some embodiments, the method 100 excludes at least one operation. For example, in some embodiments, the method 100 excludes operation 118 as described above. In some embodiments, operations of the method 100 are performed simultaneously. For example, in some embodiments, operation 114 and 120 are performed simultaneously to determine which modifiers, if any, should be applied. In some embodiments, an order of operations of the method 100 are adjusted. For example, in some embodiments, the operation 118 is performed prior to the operation 114.

By using the method 100, responsive connections are prioritized in order to reduce the risk of the network being overwhelmed. In addition, new connections are prioritized in order to maintain and increase customer satisfaction. The method 100 does not depend on any specific communication protocol. As a result, the method 100 is usable for a wide variety of communication protocols and is adaptable for implementation in a variety of networks.

Figure 2:
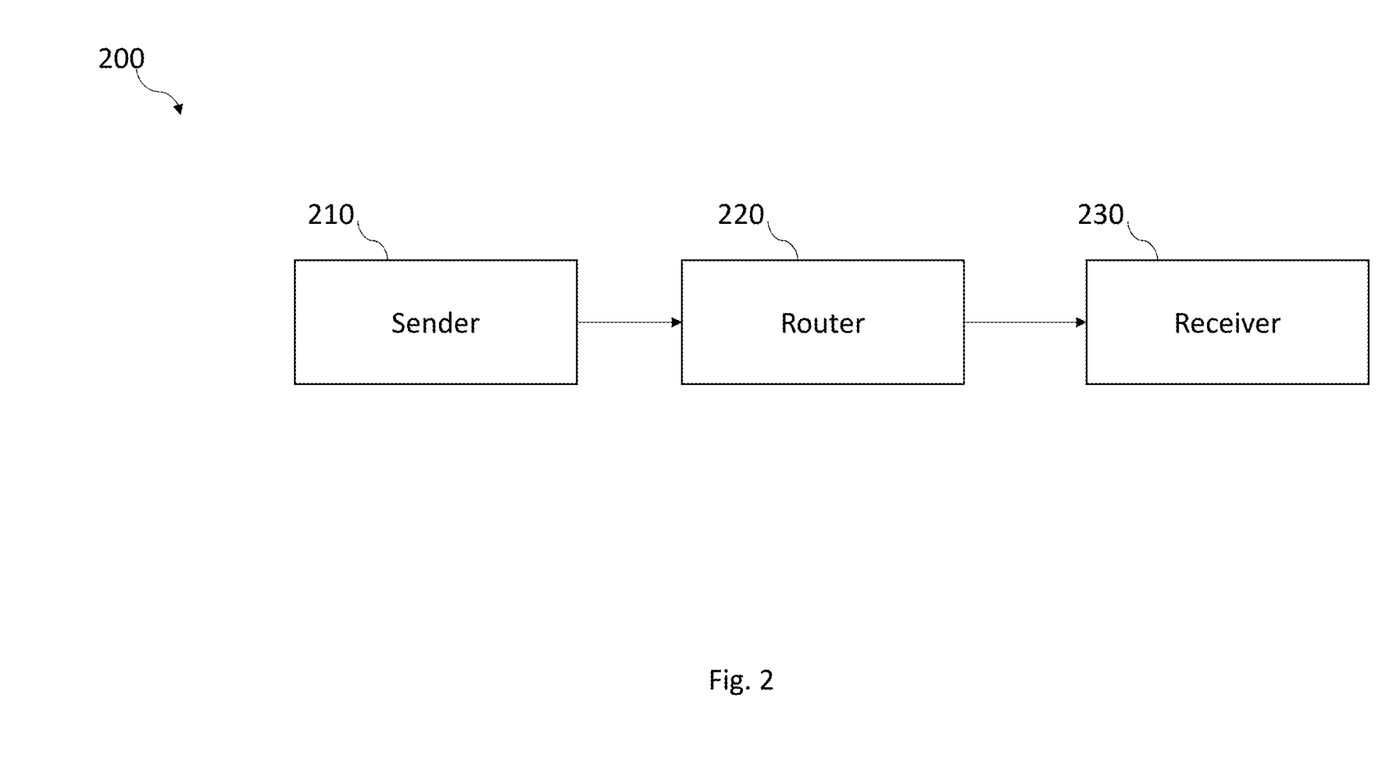
FIG. 2 is a schematic view of a system implementing a flow queueing method in accordance with some embodiments.

FIG. 2 is a schematic view of a system 200 implementing a flow queueing method in accordance with some embodiments. In some embodiments, the system 200 is a wireless communication system. In some embodiments, the system 200 is a wired communication system. In some embodiments, the system 200 includes a mixture of wireless and wired communication.

The system 200 includes a sender 210. The sender 210 output packets of information. In some embodiments, the sender 210 is a user terminal, such as a mobile phone, a personal computer, or another suitable user terminal. In some embodiments, the sender 210 is an automated component of the system 200. The system 200 includes a single sender 210. One of ordinary skill in the art would understand that the system 200 is capable of including more than one sender 210.

The sender 210 outputs the packets of data to a router 220. The router 220 receives the packets from the sender 210 and processes the packets in order to direct the packets to a proper receiver, e.g., a receiver 230. The router 220 is configured to implement a flow queueing method, such as the method 100. The router 220 is configured to transfer accepted packets to the receiver 230. The system 200 includes a single router 220. One of ordinary skill in the art would understand that the system 200 is capable of including more than one router 220.

The router 220 outputs the packets of data to the receiver 230. The receiver 230 receives the packets, generates acknowledgements to be sent back to the sender 210 and communicates with the sender 210 through the router 220. The system 200 includes a single receiver 230. One of ordinary skill in the art would understand that the system 200 is capable of including more than one receiver 230.

Figure 3:
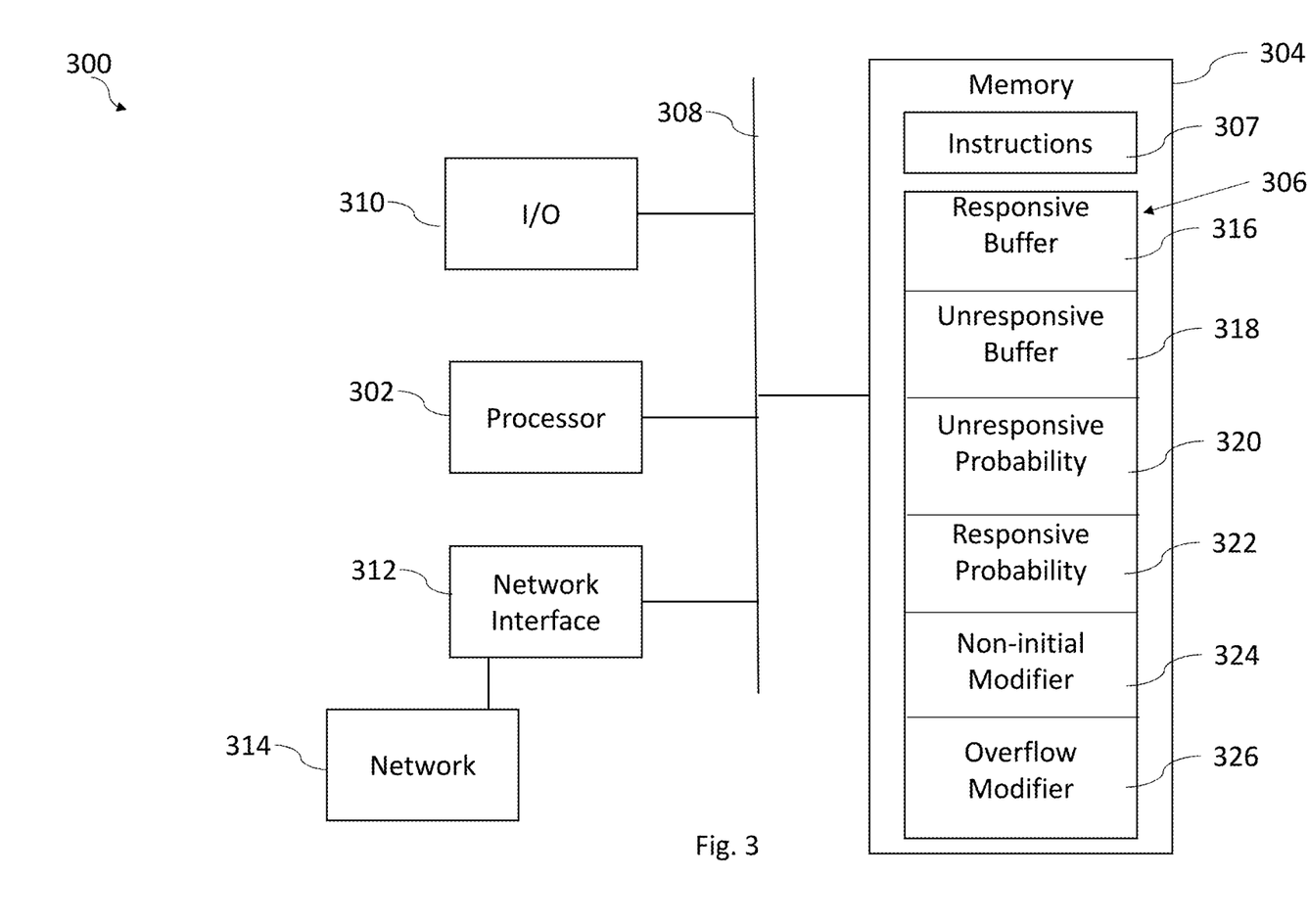
FIG. 3 is a block diagram of a system for implementing a flow queueing method in accordance with some embodiments.

FIG. 3 is a block diagram of a system 300 for implementing a flow queueing method in accordance with some embodiments. System 300 includes a hardware processor 302 and a non-transitory, computer readable storage medium 304 encoded with, i.e., storing, the computer program code 306, i.e., a set of executable instructions. Computer readable storage medium 304 is also encoded with instructions 307 for interfacing with different devices within a network. The processor 302 is electrically coupled to the computer readable storage medium 304 via a bus 308. The processor 302 is also electrically coupled to an I/O interface 310 by bus 308. A network interface 312 is also electrically connected to the processor 302 via bus 308. Network interface 312 is connected to a network 314, so that processor 302 and computer readable storage medium 304 are capable of connecting to external elements via network 314. The processor 302 is configured to execute the computer program code 306 encoded in the computer readable storage medium 304 in order to cause system 300 to be usable for performing a portion or all of the operations as described in method 100.

In some embodiments, the processor 302 is a central processing unit (CPU), a multi-processor, a distributed processing system, an application specific integrated circuit (ASIC), and/or a suitable processing unit.

In some embodiments, the computer readable storage medium 304 is an electronic, magnetic, optical, electromagnetic, infrared, and/or a semiconductor system (or apparatus or device). For example, the computer readable storage medium 304 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 304 includes a compact disk-read only memory (CD-ROM), a compact disk-read/write (CD-R/W), and/or a digital video disc (DVD).

In some embodiments, the storage medium 304 stores the computer program code 306 configured to cause system 300 to perform method 100. In some embodiments, the storage medium 304 also stores information needed for performing a method 100 as well as information generated during performing the method 100, such as a responsive buffer parameter 316, an unresponsive buffer parameter 318, an unresponsive probability parameter 320, a responsive probability parameter 322, a non-initial modifier parameter 324, an overflow modifier parameter 326 and/or a set of executable instructions to perform the operation of method 100.

In some embodiments, the storage medium 304 stores instructions 307 for interfacing with external components within the network. The instructions 307 enable processor 302 to generate instructions readable by the external components to effectively implement method 100.

System 300 includes I/O interface 310. I/O interface 310 is coupled to external circuitry. In some embodiments, I/O interface 310 includes a keyboard, keypad, mouse, trackball, trackpad, and/or cursor direction keys for communicating information and commands to processor 302.

System 300 also includes network interface 312 coupled to the processor 302. Network interface 312 allows system 300 to communicate with network 314, to which one or more other computer systems are connected. Network interface 312 includes wireless network interfaces such as BLUETOOTH, WIFI, WIMAX, GPRS, or WCDMA; or wired network interface such as ETHERNET, USB, or IEEE-1394. In some embodiments, method 100 is implemented in two or more systems 300, and information such as memory type, memory array layout, I/O voltage, I/O pin location and charge pump are exchanged between different systems 300 via network 314.

System 300 is configured to receive information related to a size of a response buffer through I/O interface 310. The information is transferred to processor 302 via bus 308 to determine a capacity of the responsive buffer. The capacity is then stored in computer readable medium 304 as responsive buffer parameter 316. System 300 is configured to receive information related to a size of an unresponsive buffer through I/O interface 310. The information is transferred to processor 302 via bus 308 to determine a capacity of the unresponsive buffer. The capacity is then stored in computer readable medium 304 as unresponsive buffer parameter 318. System 300 is configured to receive information related to a prioritization of responsive connections versus unresponsive connections through I/O interface 310. The information is transferred to processor 302 via bus 308 to determine a probability for dropping a packet from an unresponsive connection. The result is then stored in computer readable medium 304 as unresponsive probability parameter 320. The information is transferred to processor 302 via bus 308 to determine a probability for dropping a packet from a responsive connection. The result is then stored in computer readable medium 304 as responsive probability parameter 322. System 300 is configured to receive information related to a prioritization of establishing new connections through I/O interface 310. The information is transferred to processor 302 via bus 308 to determine a non-initial modifier. The result is then stored in computer readable medium 304 as non-initial modifier parameter 324. System 300 is configured to receive information related to a risk tolerance for the network being overwhelmed through I/O interface 310. The information is transferred to processor 302 via bus 308 to determine an overflow modifier. The result is then stored in computer readable medium 304 as overflow modifier parameter 326.

An aspect of this description relates to a method. The method includes receiving a packet. The method further includes determining whether the packet is part of a responsive connection. The method further includes determining whether a responsive buffer is full in response to a determination that the packet is part of the responsive connection. The method further includes applying a responsive probability to the packet in response to a determination that the responsive buffer is full. The method further includes determining whether to drop the packet based on the responsive probability. The method further includes accepting the packet for processing in response to a determination that the responsive buffer is not full or in response to a determination not to drop the packet. In some embodiments, the method further includes determining whether an unresponsive buffer is full in response to a determination that the packet is not part of the responsive connection; and applying an unresponsive probability to the packet in response to a determination that the unresponsive buffer is full. In some embodiments, the method further includes accepting the packet in response to a determination that the unresponsive buffer is not full. In some embodiments, the method further includes determining whether a combined buffer exceeds a threshold value; and applying an overflow modifier to the unresponsive probability in response to a determination that the combined buffer exceeds the threshold value. In some embodiments, determining whether to drop the packet further includes determining whether to drop the packet based on the unresponsive probability in response to a determination that the combined buffer is equal to or less than the threshold value; and determining whether to drop the packet based on the unresponsive probability modified by the overflow modifier in response to a determination that the combined buffer exceeds the threshold value. In some embodiments, the unresponsive probability is greater than the responsive probability. In some embodiments, the method further includes determining whether the packet is part of a setup phase; and applying a non-initial modifier to the responsive probability in response to a determination that the packet is part of the setup phase. In some embodiments, determining whether to drop the packet includes determining whether to drop the packet based on the responsive probability modified by the non-initial modifier in response to a determination that the packet is part of the setup phase. In some embodiments, the method further includes determining whether a combined buffer exceeds a threshold value; and applying an overflow modifier to the responsive probability modified by the non-initial modifier in response to a determination that the combined buffer exceeds the threshold value. In some embodiments, determining whether to drop the packet further includes determining whether to drop the packet based on the responsive probability modified by the non-initial modifier in response to a determination that the combined buffer is equal to or less than the threshold value; and determining whether to drop the packet based on the responsive probability modified by the non-initial modifier and the overflow modifier in response to a determination that the combined buffer exceeds the threshold value.

An aspect of this description relates to a method. The method includes receiving a packet. The method further includes determining whether the packet is part of a responsive connection. The method further includes determining whether an unresponsive buffer is full in response to a determination that the packet is not part of the responsive connection. The method further includes applying an unresponsive probability to the packet in response to a determination that the unresponsive buffer is full. The method further includes determining whether to drop the packet based on the unresponsive probability. The method further includes accepting the packet for processing in response to a determination that the unresponsive buffer is not full or in response to a determination not to drop the packet. In some embodiments, the determination whether to drop the packet is based on a random function. In some embodiments, the method further includes determining whether a combined buffer exceeds a threshold value; and applying an overflow modifier to the unresponsive probability in response to a determination that the combined buffer exceeds the threshold value. In some embodiments, determining whether to drop the packet further includes determining whether to drop the packet based on the unresponsive probability in response to a determination that the combined buffer is equal to or less than the threshold value; and determining whether to drop the packet based on the unresponsive probability modified by the overflow modifier in response to a determination that the combined buffer exceeds the threshold value. In some embodiments, the method further includes determining whether a responsive buffer is full in response to a determination that the packet is part of the responsive connection; and applying a responsive probability to the packet in response to a determination that the responsive buffer is full. In some embodiments, the method further includes determining whether to drop the packet based on the responsive probability; and accepting the packet for processing in response to a determination that the responsive buffer is not full or in response to a determination not to drop the packet. In some embodiments, the unresponsive probability is greater than the responsive probability.

An aspect of this disclosure relates to a system. The system includes a non-transitory computer readable medium configured to store instructions thereon. The system further includes a processor connected to the non-transitory computer readable medium. The processor is configured to execute the instructions for determining whether a received packet is part of a responsive connection. The processor is further configured to execute the instructions for determining whether a responsive buffer is full in response to a determination that the packet is part of the responsive connection. The processor is further configured to execute the instructions for applying a responsive probability to the packet in response to a determination that the responsive buffer is full. The processor is further configured to execute the instructions for determining whether to drop the packet based on the responsive probability. The processor is further configured to execute the instructions for accepting the packet for processing in response to a determination that the responsive buffer is not full or in response to a determination not to drop the packet. In some embodiments, the processor is further configured to execute the instructions for: determining whether an unresponsive buffer is full in response to a determination that the packet is not part of the responsive connection; and applying an unresponsive probability to the packet in response to a determination that the unresponsive buffer is full. In some embodiments, the processor is further configured to execute the instructions for: determining whether to drop the packet based on the unresponsive probability; and accepting the packet for processing in response to a determination that the unresponsive buffer is not full or in response to a determination not to drop the packet.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   receiving a packet;
   determining whether the packet is part of a responsive connection, wherein the responsive connection is a connection where a sender alters a speed of outputting packets in response to stateful network information;
   determining whether a responsive buffer is full in response to a determination that the packet is part of the responsive connection;
   applying a responsive probability to the packet in response to a determination that the responsive buffer is full;
   determining whether to drop the packet based on the responsive probability; and
   accepting the packet for processing in response to a determination that the responsive buffer is not full or in response to a determination not to drop the packet.

2. The method of claim 1, further comprising:
   determining whether an unresponsive buffer is full in response to a determination that the packet is not part of the responsive connection; and
   applying an unresponsive probability to the packet in response to a determination that the unresponsive buffer is full.

3. The method of claim 2, further comprising accepting the packet in response to a determination that the unresponsive buffer is not full.

4. The method of claim 2, further comprising:
   determining whether a combined buffer exceeds a threshold value; and
   applying an overflow modifier to the unresponsive probability in response to a determination that the combined buffer exceeds the threshold value.

5. The method of claim 4, wherein determining whether to drop the packet further comprises:
   determining whether to drop the packet based on the unresponsive probability in response to a determination that the combined buffer is equal to or less than the threshold value; and
   determining whether to drop the packet based on the unresponsive probability modified by the overflow modifier in response to a determination that the combined buffer exceeds the threshold value.

6. The method of claim 2, wherein the unresponsive probability is greater than the responsive probability.

7. The method of claim 1, further comprising:
   determining whether the packet is part of a setup phase; and
   applying a non-initial modifier to the responsive probability in response to a determination that the packet is part of the setup phase.

8. The method of claim 7, wherein determining whether to drop the packet comprises determining whether to drop the packet based on the responsive probability modified by the non-initial modifier in response to a determination that the packet is part of the setup phase.

9. The method of claim 8, further comprising:
   determining whether a combined buffer exceeds a threshold value; and
   applying an overflow modifier to the responsive probability modified by the non-initial modifier in response to a determination that the combined buffer exceeds the threshold value.

10. The method of claim 9, wherein determining whether to drop the packet further comprises:
    determining whether to drop the packet based on the responsive probability modified by the non-initial modifier in response to a determination that the combined buffer is equal to or less than the threshold value; and
    determining whether to drop the packet based on the responsive probability modified by the non-initial modifier and the overflow modifier in response to a determination that the combined buffer exceeds the threshold value.

11. A method comprising:
    receiving a packet;
    determining whether the packet is part of a responsive connection, wherein the responsive connection is a connection where a sender alters a speed of outputting packets in response to stateful network information;
    determining whether an unresponsive buffer is full in response to a determination that the packet is not part of the responsive connection;
    applying an unresponsive probability to the packet in response to a determination that the unresponsive buffer is full;
    determining whether to drop the packet based on the unresponsive probability; and
    accepting the packet for processing in response to a determination that the unresponsive buffer is not full or in response to a determination not to drop the packet.

12. The method of claim 11, wherein the determination whether to drop the packet is based on a random function.

13. The method of claim 11, further comprising:
    determining whether a combined buffer exceeds a threshold value; and
    applying an overflow modifier to the unresponsive probability in response to a determination that the combined buffer exceeds the threshold value.

14. The method of claim 13, wherein determining whether to drop the packet further comprises:
    determining whether to drop the packet based on the unresponsive probability in response to a determination that the combined buffer is equal to or less than the threshold value; and
    determining whether to drop the packet based on the unresponsive probability modified by the overflow modifier in response to a determination that the combined buffer exceeds the threshold value.

15. The method of claim 11, further comprising:
    determining whether a responsive buffer is full in response to a determination that the packet is part of the responsive connection;
    applying a responsive probability to the packet in response to a determination that the responsive buffer is full.

16. The method of claim 15, further comprising:
    determining whether to drop the packet based on the responsive probability; and accepting the packet for processing in response to a determination that the responsive buffer is not full or in response to a determination not to drop the packet.

17. The method of claim 15, wherein the unresponsive probability is greater than the responsive probability.

18. A system comprising:
a non-transitory computer readable medium configured to store instructions thereon; and
a processor connected to the non-transitory computer readable medium, wherein the processor is configured to execute the instructions for:
  determining whether a received packet is part of a responsive connection, wherein the responsive connection is a connection where a sender alters a speed of outputting packets in response to stateful network information;
  determining whether a responsive buffer is full in response to a determination that the packet is part of the responsive connection;
  applying a responsive probability to the packet in response to a determination that the responsive buffer is full;
  determining whether to drop the packet based on the responsive probability; and
  accepting the packet for processing in response to a determination that the responsive buffer is not full or in response to a determination not to drop the packet.

19. The system of claim 18, wherein the processor is further configured to execute the instructions for:
  determining whether an unresponsive buffer is full in response to a determination that the packet is not part of the responsive connection; and
  applying an unresponsive probability to the packet in response to a determination that the unresponsive buffer is full.

20. The system of claim 19, wherein the processor is further configured to execute the instructions for:
  determining whether to drop the packet based on the unresponsive probability; and
  accepting the packet for processing in response to a determination that the unresponsive buffer is not full or in response to a determination not to drop the packet.

* * * * *